April 19, 1932.  E. OSTLIND  1,854,346
DEPTH GAUGE
Filed Dec. 13, 1930   2 Sheets-Sheet 2
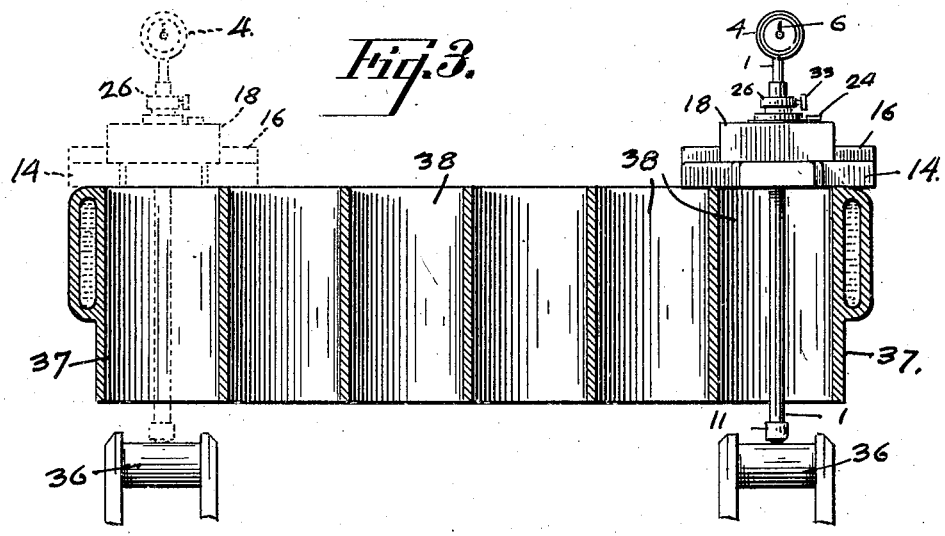
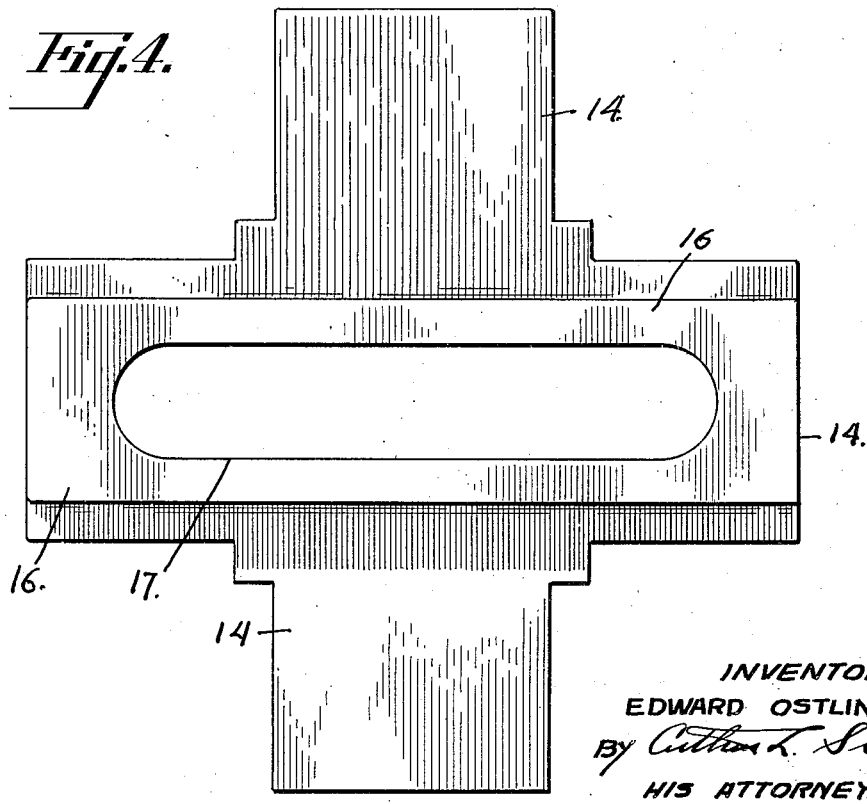
INVENTOR
EDWARD OSTLIND
By Arthur L. Slee
HIS ATTORNEY.

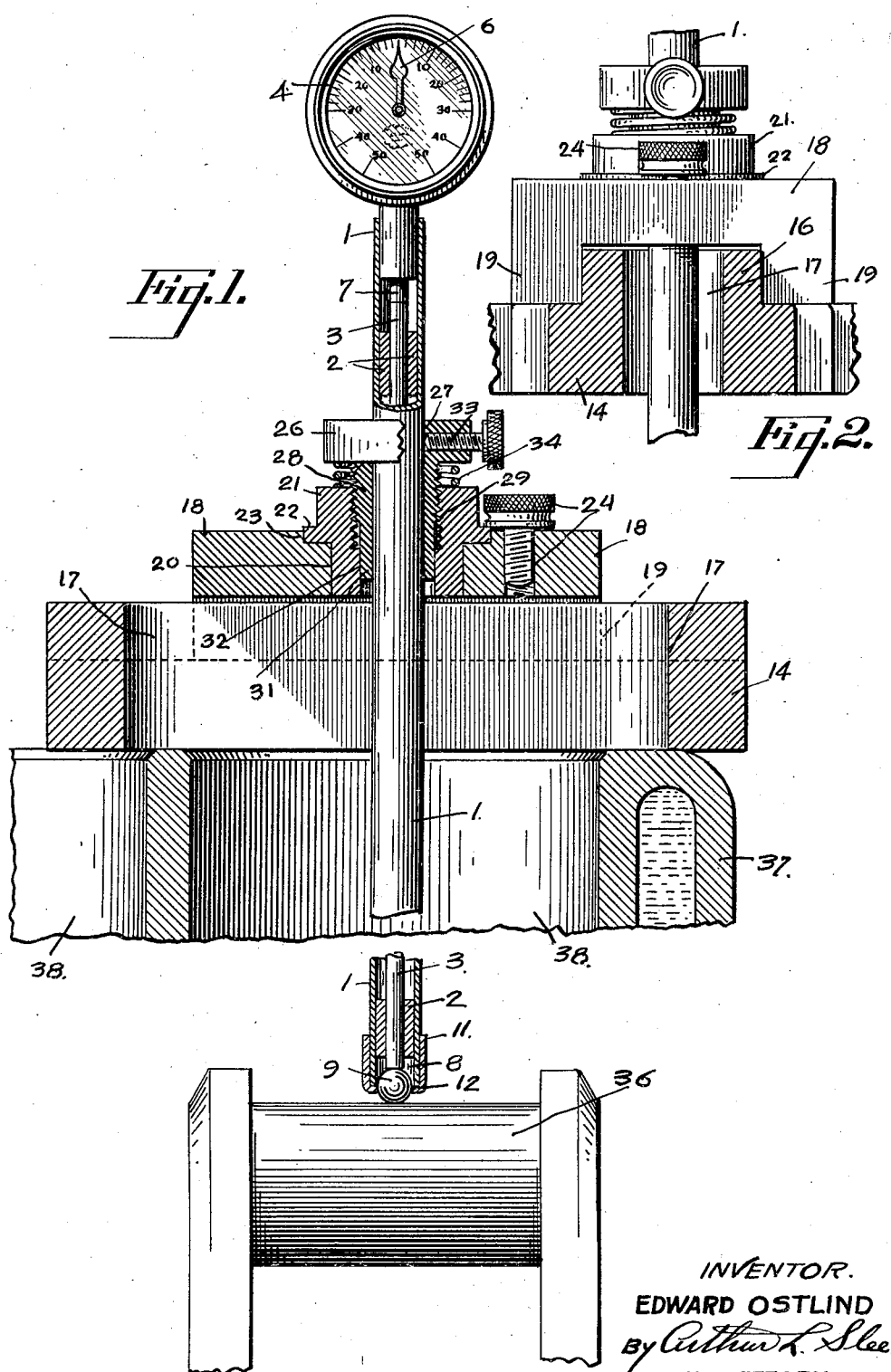

Patented Apr. 19, 1932

1,854,346

UNITED STATES PATENT OFFICE

EDWARD OSTLIND, OF OAKLAND, CALIFORNIA

DEPTH GAUGE

Application filed December 13, 1930. Serial No. 502,104.

My invention relates to improvements in gauge mechanism wherein indicator actuating means is arranged to be suspended at right angles to a plane surface to indicate the relative depth below said surface of various chosen points.

The primary object of my invention is to provide an improved depth gauge.

Another object is to provide an improved gauge mechanism whereby the alinement of crank-shafts and the main bearings of an internal combustion engine may be easily and accurately checked or determined.

A further object is to provide an improved gauge mechanism facilitating adjustment for use upon engines of various sizes.

Another object is to provide an improved mechanism of the character described which is simple in construction and operation and which affords very great accuracy.

A still further object is to provide an improved mechanism embodying improved features of construction and arrangement affording economy in manufacture and efficiency in operation.

I accomplish these and other objects by means of the improved device disclosed in the drawings forming a part of the present application wherein like characters of reference are used to designate similar parts throughout the specification and drawings, and in which:

Fig. 1 is a broken vertical section, of my improved gauge mechanism as applied upon an engine cylinder block, parts of the gauge mechanism being shown in elevation;

Fig. 2 is a broken side elevation, partly in vertical transverse section, of the gauge mounting means;

Fig. 3 is a longitudinal vertical section of a cylinder block showing the application of my gauge to determine or check the alinement of a crank-shaft; and Fig. 4 is a plan view of the base plate upon which the gauge is supported when in use.

Referring to the drawings, the numeral 1 is used to designate a tubular stem member provided with a plurality of bearing bushings 2 slidably engaging a rod 3 extending longitudinally through the stem member. A suitable indicator 4 is mounted upon the upper end of the tubular member 1. The indicator may be of any suitable standard construction having a pointer 6 provided with actuating means 7 arranged to extend into the end of the member 1 to be engaged by the adjacent end of the rod 3. As the present invention does not consist in the specific structure of the indicator mechanism itself, a detailed disclosure of such indicator mechanism is omitted herefrom.

The lower end of the tubular member 1 has a socket 8 formed therein. A displacing member 9, preferably of spherical form, is mounted within the socket 8 and retained by means of a cap 11 threaded or otherwise secured upon the end of the member 1. The cap 11 has an opening 12 through which a portion of the member 9 extends a limited amount. The ball or member 9 is displaceable inwardly to engage and move the rod 3 and move the same axially within the tubular member 1 to actuate the indicator pointer 6.

The stem member 1 with its indicator mechanism is supported by means of a base plate 14 having its lower surface machined to seat flat upon the upper surface of a supporting body such as the cylinder block of an internal combustion engine. The plate 14 is preferably formed in the shape of a cross having laterally disposed extensions arranged to span the top of a cylinder bore formed in a cylinder block. The upper surface of the plate 14 is provided with a raised track or guide portion 16 and is machined to true parallel relation to the bottom surface of the plate 14. The plate 14 has a slot 17 formed therein through which the stem member 1 may extend downwardly, the slot 17 being disposed longitudinally with respect to the track 16.

A supporting plate 18 is slidably mounted upon the track portion 16 of the base plate 14, said plate being provided with flange portions 19 projecting downwardly at the sides of the track portion 16. The plate 18 is movable along the track 16 and is provided with an opening 20 substantially matching with the slot 17.

A bushing 21 is rotatably mounted within the opening 20. The bushing 21 is provided with an annular flange 22 intermediate its ends and seating within an annular recess 23 formed in the upper face of the plate 18 around the opening 20. The upper face of the flange 22 projects slightly above the face of the plate 18. A securing member 24 is threaded into the plate 18 at one side of the bushing and is provided with a knurled head overhanging the edge of the flange 22 whereby the bushing may be clamped and held against rotation when desired. The upwardly extending portion of the bushing is arranged to be gripped and turned manually, as hereinafter more fully explained.

A collar 26, having an axial bore 27 arranged to slidably receive the tubular member 1, is provided with a reduced threaded portion 28 arranged to engage threads 29 formed within an axial opening through the bushing 21. A still further reduced extension 31 is formed upon the collar to engage a reduced bearing portion 32 of the bushing whereby the collar is accurately held in coaxial relation with the bushing when the collar and bushing are moved relative to each other by the threads 29. A set screw 33 is tapped into the collar 26, said set screw, when loosened, permitting the member 1 to be freely movable axially through the collar. When the set screw is tightened, the member 1 is rigidly secured against movement relative to the collar. A spring 34 is mounted around the reduced portion of the collar between the top of the bushing and the flange portion of the collar to take up back-lash from the threads, and to facilitate the holding of either the collar or the bushing against rotation while the other is being turned to adjust the device as hereinafter more fully explained.

In operation, my improved depth gauge is primarily useful for determining or checking the alinement of the crank-shafts of internal combustion engines. In the construction of internal combustion engines of the ordinary type, the crank-shaft 36, of a shaft not shown, is disposed in true parallel relation with the upper surface of the cylinder block 37 of such an engine. Unless this parallel relation is accurately maintained, the efficiency of the engine is greatly impaired and serious damage to the engine may result. Factory methods usually produce an accurate alinement of the main bearings and crank-shaft when an engine is built. In service, however, it often happens that the bearings wear unequally and the crank-shaft is thrown out of its true alinement. In replacing or reboring bearings, the ordinary shop equipment does not always insure the accuracy necessary for efficient alining of the bearings and crank-shaft. In overhauling used engines, and in checking new engines, it is highly desirable that the alinement of the crankshaft be accurately gauged and it is for this purpose that my improved gauge is primarily useful.

To check the alinement of a crank-shaft, the cylinder head is removed and the base plate 14 is placed flat upon the top of the cylinder block 37 over one of the cylinder bores 38, preferably an end bore, as shown in Figs. 1 and 3 of the drawings. The supporting plate 18 with the bushing 21, collar 26, and stem 1, assembled thereon, substantially as shown, is then placed upon the mounting base with the stem extending downwardly through the cylinder and supported in true right angular relation to the plane of the top of the cylinder block. The set screw 33 is loosened to permit the stem to be raised or lowered to the approximate adjustment necessary for the particular block being tested. The set screw 33 is then tightened, and final adjustment is made by turning the bushing 21 and collar 26 relative to each other to raise or lower the stem to the precise adjustment. By means of the slot 17, the stem is moved to a position directly over a selected point upon the crank immediately below the bore, the stem being shifted transversely, and raised and lowered by means of the threaded connection between the bushing and collar until the outwardly extending portion of the member 9 contacts with the highest portion of the crank and displaces the rod 3 upwardly sufficiently to actuate the pointer 6 to a zero reading at the center of the indicator dial.

The device is then lifted bodily, without altering the adjustment, and is applied through the corresponding cylinder bore 38 at the other end of the cylinder block. Thus, in six cylinder engines, the first and last cranks ordinarily occupy corresponding positions, and after adjusting the gauge upon one of these cylinders, as above described, the gauge is moved bodily onto the other of said cylinders, and by means of transverse movement upon the base 14, the stem is moved to contact with the corresponding point upon the second crank. If the crank shaft be accurately alined with respect to the top of the cylinder block, the member 9 will contact with the crank and displace the rod 3 upwardly the same amount as before, and the indicator pointer 6 will again be moved to its central zero reading. Should the shaft be out of true parallel relation to the top of the cylinder, the pointer will be displaced a greater or lesser amount, as the case may be, and will indicate a plus or minus reading indicating the amount the second point tested is above or below the level of the first point tested. The indicator is preferably graduated in thousandths of an inch, so that the precise amount the shaft is out of line may be observed at a glance.

By shifting the stem along the slot 17, so that the member 9 will engage successive points along the length of a desired connecting rod bearing, any inequality in wear will be indicated by the relative movement of the pointer when the member 9 is moved to contact various points along the length of any particular bearing.

When the bearings of a block are to be rebored, the alinement may be accurately determined by applying my improved gauge mechanism as above explained, the gauge being adjusted with respect to the boring bar at one end, and then being applied at the opposite end to indicate whether or not the true parallel relation of said bar relative to the top of the cylinder block has been obtained.

To facilitate the final adjustment of the device and to render the indicator easily readable, the securing member 24 is loosened after the approximate adjustment of the stem has been effected. The collar 26 is then held with one hand with the face of the dial directed toward the operator. With the other hand, the operator then rotates the bushing 21 to raise or lower the collar and stem to final adjusted position, thereby insuring that the indicator may be read by the operator without altering his position. The spring 34 facilitates the holding of the collar against rotation, and takes up any back lash which may be present in the threaded connection, and also holds the stem and collar firmly in adjusted position, until positive pressure is applied upon either the collar or bushing to change the adjustment. After the device has been accurately adjusted in one position, the securing member 24 is tightened to clamp the bushing in place until further adjustment is necessary.

The length of the stem member 1 is sufficient to meet the requirement of substantially all engines, and as the indicator operates to show a relative difference in depth at various points upon any particular engine, the device may be adjusted for use upon substantially any engine.

While I have illustrated and described only one embodiment of my invention, the device is, of course, subject to modification in numerous ways without departing from the spirit of my invention. In like manner, the device may be applied advantageously in various other ways where it is desired to determine the relative depth to various points from a common surface. I, therefore, do not wish to be restricted to the specific details of construction and arrangement, or to the specific use herein described, but desire to avail myself of all modifications which may fall within the scope of the appended claims.

Having thus described my invention, what I claim as new and desire to secure by Letters Patent is:

1. A gauge comprising a tubular stem member adapted to extend through the cylinder bores of an engine cylinder block; an indicator mounted upon the upper end of the stem member; means extending longitudinally through the stem member and adapted to be actuated from the lower end thereof for operating the indicator; stem mounting means adjustably supporting the stem member suspended within a cylinder bore at right angles to the plane of the upper surface of the cylinder block, said means comprising a base plate having an opening to receive the stem member, supporting means mounted upon the base member, and a collar adjustably secured to the stem and having threaded engagement with the supporting means to axially adjust the stem member relative to the supporting means.

2. A gauge comprising a tubular stem member adapted to extend through the cylinder bores of an engine cylinder block; an indicator mounted upon the upper end of the stem member; means extending longitudinally through the stem member and adapted to be actuated from the lower end thereof for operating the indicator; stem mounting means adjustably supporting the stem member suspended within a cylinder bore at right angles to the plane of the upper surface of the cylinder block, said means comprising a base plate adapted to seat upon the top of the cylinder block and slotted to receive the stem member; a mounting plate slidably engaging the base plate; a collar slidably mounted upon the stem member; means to secure the collar to the stem in adjusted position thereon; and threaded means connecting the collar and the mounting plate.

3. A gauge comprising a tubular stem member adapted to extend through the cylinder bores of an engine cylinder block; an indicator mounted upon the upper end of the stem member; means extending longitudinally through the stem member and adapted to be actuated from the lower end thereof for operating the indicator; a base plate adapted to seat upon the top of the cylinder block over a cylinder bore thereof, said plate being slotted to receive the stem member; a mounting plate slidably adjustable upon the base plate; a bushing mounted upon the mounting plate; a collar slidably engaging the stem and having a threaded portion threaded into the bushing; and means to secure the collar at a desired position upon the stem member, the stem member being held suspended through the supporting base and within a cylinder bore at right angles to the top of the cylinder block and being movable axially to a finely adjusted position by a rotation of the collar relative to the bushing.

4. A gauge comprising a tubular stem member adapted to extend through the cylinder bores of an engine cylinder block; an indicator mounted upon the upper end of the stem member; means extending longitudinally through the stem member and adapted to be actuated from the lower end thereof for operating the indicator; a base plate adapted to seat upon the top of the cylinder block over a cylinder bore thereof, said plate being slotted to receive the stem member; a mounting plate slidably adjustable upon the base plate; a bushing mounted upon the mounting plate; a collar slidably engaging the stem and having a threaded portion threaded into the bushing; means to secure the collar at a desired position upon the stem member, the stem member being held suspended through the supporting base and within a cylinder bore at right angles to the top of the cylinder block and being movable axially to a finely adjusted position by a rotation of the collar relative to the bushing; and means operable to lock the bushing against rotation relative to the mounting plate, said means being movable to release said bushing for rotation relative to the mounting plate and collar.

In witness whereof, I hereunto set my signature.

EDWARD OSTLIND.